United States Patent Office 3,084,178
Patented Apr. 2, 1963

3,084,178
RECOVERY OF 10-HYDROXYDECANOIC ACID
Gordon Ian Fray, Camberley, Renee Hermine Jaeger, Oxford, and Eric David Morgan, Camberley, England, assignors to Shell Oil Company, New York, N.Y., a corporation of Delaware
No Drawing. Filed Aug. 28, 1961, Ser. No. 134,101
Claims priority, application Great Britain Sept. 1, 1960
3 Claims. (Cl. 260—418)

The invention relates to improvements in the production of 10-hydroxydecanoic acid and 10-acetoxydecanoic acid.

When ricinoleic acid, or a salt or ester thereof, is heated in the presence of a concentrated aqueous alkali metal hydroxide solution, the resulting reaction products consist predominantly of octanol-2, octanone-2, sebacic acid and 10-hydroxydecanoic acid. Suitable alkali metal hydroxide solutions comprise the aqueous solutions of NaOH and KOH. The reaction is carried out advantageously in a homogeneous liquid medium by employing an alkali metal phenoxide, or mixtures of such phenoxides, as solvent for the reagents. Suitable solvents comprise sodium phenoxide and potassium phenoxide. The reaction may be accelerated by adding from about 1 to about 10% by weight of an alkali metal nitrate, such as, for example, sodium nitrate or potassium nitrate, based on the weight of ricinoleic acid, or its salt or ester, used. A suitable source of the ricinoleic acid is castor oil, which generally contains about 85% of the triglyceride. The reaction may be carried out by heating the reaction mixture at a temperature of, for example, that approximating the boiling temperature of the reaction mixture. Heating the mixture under refluxing conditions has been found particularly satisfactory.

The reaction mixture obtained by heating ricinoleic acid in the presence of the alkali metal hydroxide is thereafter freed of lower boiling organic components comprising, for example, octanol-2 and octanone-2. This is suitably carried out by distillation. The resulting distillation residue, now free of any substantial amount of lower boiling components, is acidified, for example, with a strong mineral acid, such as sulfuric acid, to liberate organic acids as free acids. The acidified mixture is thereupon freed of any phenols and sebacic acid by extraction with hot water, the water being preferably close to its boiling temperature. The oily residue remaining after the aqueous extraction contains 10-hydroxydecanoic acid in admixture with fatty acids and also phenols derived from any phenoxide solvent employed.

It has been proposed to separate 10-hydroxydecanoic acid from the oily residue so obtained by treating it with a solvent which selectively dissolves the fatty acids and any phenols present. Carbon tetrachloride is the only solvent specified for this prupose. However, although this procedure was repeated carefully several times, it was found that carbon tetrachloride does not effect a separation of fatty acids from 10-hydroxydecanoic acid and, indeed, little or no precipitate forms on treating the oily residue with carbon tetrachloride. Recovery of the desired 10-hydroxydecanoic acid from the oily residue has heretofore presented serious difficulties detracting materially from efficient utilization of this readily available potential source of this valuable material.

It is, therefore, an object of the present invention to provide an improved process enabling the more efficient recovery of 10-hydroxydecanoic acid from the oily reaction products obtained by heating ricinoleic acid in the presence of aqueous alkali metal hydroxide.

Another object is the provision of an improved process enabling the more efficient recovery of the 10-hydroxydecanoic acid content from the oily reaction products obtained by the reaction of ricinoleic acid with alkali metal hydroxide wherein said 10-hydroxydecanoic acid is obtained as 10-acetoxydecanoic acid. Other objects and advantages of the present invention will become apparent from the following detailed description thereof.

In accordance with the invention 10-hydroxydecanoic acid is recovered as 10-acetoxydecanoic acid from the oily, 10-hydroxydecanoic acid-containing residue obtained by the sequential steps of (a) heating ricinoleic acid with aqueous alkali metal hydroxide, (b) removing lower boiling components comprising octanol and octanone from the resulting reaction mixture, (c) acidifying the resulting reaction mixture now freed of lower boiling components, and (d) extracting the acidified reaction mixture with hot water, by acetylating said oily 10-hydroxydecanoic acid-containing residue, and separating 10-acetoxydecanoic acid from the resulting acetylation products.

In one embodiment of the invention, the oily 10-hydroxydecanoic acid-containing residue is first treated with a solvent capable of selectively dissolving at least a part of fatty acids and/or phenolic components present before being subjected to said acetylation.

In another embodiment of the invention, 10-acetoxydecanoic acid separated from the acetylation reaction mixture is hydrolyzed to revert the 10-acetoxydecanoic acid back to 10-hydroxydecanoic acid.

The invention thus enables the efficient recovery of 10-hydroxydecanoic acid from said oily residue, obtained as a product of the ricinoleic-alkali metal hydroxide reaction, in a high state of purity, either as such or in the form of 10-acetoxydecanoic acid.

The recovery process of the invention is applied with particular advantage to oily 10-hydroxydecanoic acid-containing residues obtained by interaction of ricinoleic acid, as such or in the form of its salt or ester, with alkali metal hydroxide in a homogeneous liquid medium in the presence of an alkali metal phenoxide, or mixture of phenoxides, for example, those derived from commercial cresol or xylenol mixtures.

The 10-hydroxydecanoic acid-containing residue starting material should preferably be in anhydrous, or substantially anhydrous, state before being subjected to the acetylation treatment of the present invention. Any water present is preferably removed by treatment with a suitable dehydrating agent, for example, anhydrous magnesium sulfate, with or without the aid of a volatile solvent or diluent. The dehydrating agent, and solvent and/or diluent if employed, are removed after the drying step.

Acetylation of the 10-hydroxydecanoic acid-containing oily residue is effected with a suitable acetylating agent such as, for example, acetic anhydride. The acetylation is effected by heating the oily residue starting material, in admixture with the acetylating agent, at a temperature ranging, for example, from about 50° C. to about the boiling temperature of the mixture. In a suitable method of effecting the acetylation treatment the mixture is heated under refluxing conditions. The heating is continued for a period of time which will vary within the scope of the invention in accordance with the specific temperatures employed. In general a heating period of from about 3 to about 7 hours is generally found to be satisfactory. Under these conditions the 10-hydroxydecanoic acid will react with the formation of reaction products comprising 10-acetoxydecanoic acid. After the heating step the reaction mixture is cooled, for example, by quenching with cold water. Thus, the reaction mixture may be discharged into water or onto ice. Decomposition of unreacted acetic anhydride will take place. The resulting reaction products comprising 10-acetoxydecanoic acid are separated from the aqueous phase by suitable means. For example, they may be separated from the aqueous phase by liquid phase extraction with a suitable organic solvent. A suitable solvent comprises, for example, diethyl ether, hydrocarbon solvents of aromatic or nonaromatic character such as, for example, benzene, lower boiling paraffinic hydrocarbons, petroleum ether, low boiling gasoline fractions having a boiling temperature up to about 120° C., and the like. The product of the acetylation treatment may be washed with water prior to the extraction. In a preferred procedure the acetylated product is washed in the form of its solution in the organic solvent employed to extract it from the acetylation reaction mixture. The solution is then dried and freed of solvent by conventional means. The oily acetylation product so obtained, after the removal of the solvent, may be subjected to further distillation procedure to effect the separation therefrom of a product of high purity therefrom. Pure 10-acetoxydecanoic acid having a boiling temperature in the range of 140 to 142° C. at 0.2 mm. pressure is thus readily obtained as a final product.

As indicated above, 10-hydroxydecanoic acid is not separated by means of carbon tetrachloride from the oily 10-hydroxydecanoic acid-containing residue obtained by distilling and extracting with hot water the ricinoleic acid-alkali metal hydroxide reaction products. It has now been found, however, that quite surprisingly, substantially non-aromatic hydrocarbon solvent, such as, for example, the lower paraffins, petroleum ether, gasoline fractions having a boiling range of from about 60 to about 80° C., and the like, enables the removal from such oily residues components other than the desired 10-hydroxydecanoic acid. Extraction of these oily residues with the hydrocarbon solvent will, therefore, result in the obtaining of a solvent phase comprising solvent and fatty acids, and also phenolic compounds if present, leaving a substantially insoluble phase of semi-solid, or even solid, character containing the 10-hydroxydecanoic acid.

In one embodiment of the invention, the 10-hydroxydecanoic acid-containing residue, obtained from the ricinoleic acid-alkali metal hydroxide reaction products is treated with a suitable organic solvent selectively dissolving fatty acids, or fatty acids and phenols, therefrom. The non-soluble residue containing the 10-hydroxydecanoic acid is thereupon subjected to acetylation. Suitable organic solvents comprise the hydrocarbon solvents, particularly the substantially non-aromatic hydrocarbon solvents defined hereinabove.

The 10-acetoxydecanoic acid of relatively high purity thus obtained in accordance with the process of the invention is subjected to suitable conventional conditions of hydrolysis to revert it to reaction products comprising 10-hydroxydecanoic acid. Suitable conditions of hydrolysis comprise those disclosed in the prior art for the hydrolyzing of fatty acid esters. A suitable method comprises the refluxing of the 10-acetoxydecanoic acid with a slight excess of aqueous alcoholic sodium or potassium hydroxide, and springing the 10-hydroxydecanoic acid by treatment with a mineral acid, for example, sulfuric acid, preferably at a temperature of from about 0 to about 5° C.

The following examples illustrate the process of the invention. In these examples, parts by weight ($w$) and parts by volume ($v$) have the same relative relationship as the kilogram and the litre.

*Example I*

A mixture of sodium hydroxide (115 w.), water (40 v.), tricresol (45 w.) and castor oil (150 w.) was heated under reflux in an oil bath at 180° to 195° C. with vigorous stirring. Violent frothing occurred in the earlier stages of the reaction but was controlled by stirring at high speed. After 3 hours, the volatile products were removed by distillation, the oil bath being maintained at the same temperature. Stirring was continued during the distillation. The distillation residue was then dissolved in water (1500 v.), acidified to Congo red with 50% sulfuric acid (about 190 v.) and the mixture brought to the boil. The aqueous layer which contained sebacic acid was separated while still hot from the oily upper layer. The remaining oily layer was diluted with ether and dried with anhydrous magnesium sulfate. After removing the drying agent and the ether, the oily residue (175 w.) containing cresols, 10-hydroxydecanoic acid and other acids was refluxed with acetic anhydride (350 v.) for about 5 hours and the reaction mixture was then poured on to ice and left to stand at room temperature overnight. The product was collected in ether. The ethereal extract was washed with water and dried over anhydrous magnesium sulfate. After removal of the ether solvent the residue was subjected to careful fractional distillation, the fraction of B.P. 136–160° C. at 0.2 mm. pressure (56 w.) being collected; refractionation of this gave a fraction of B.P. 140° to 146° C. at 0.2 mm. pressure (48 w.) and from this a final fractionation isolated pure 10-acetoxydecanoic acid (45 w.) B.P. 140° to 142° C. at 0.2 mm. pressure. The infrared spectrum of this material had peaks at $5.76\mu$ (c.=O of acetate) and $5.87\mu$ (c.=O of carboxyl). A small sample was crystallized from petroleum ether (B.P. below 40° C.); this had a melting point of 36°.

*Example II*

The oily residue, obtained and dried as described in Example I, was dissolved in hot petroleum ether (B.P. 60° to 80°; 300 v.) and allowed to cool to room temperature. The supernatant liquid was decanted from the precipitated material, and the latter was then refluxed with acetic anhydride (300 v.) for 5 hours. The resulting reaction mixture was worked up as described in Example I. 10-acetoxydecanoic acid (40.6 w.) was isolated by fractional distillation.

*Example III*

A mixture of 10-acetoxydecanoic acid (5 w.) prepared as described in Example I, potassium hydroxide (3 w.), water (5 v.) and ethanol (25 v.) was heated for 1.5 hours at refluxing temperature. Most of the alcohol was then removed under reduced pressure and sufficient water was added to dissolve the resultant precipitate. The resulting alkaline solution was acidified with ice-cold 25% aqueous sulfuric acid and the colorless solid obtained was filtered off, dried and recrystallized from ether. The 10-hydroxydecanoic acid so obtained (3.55 w.) had a melting point of 75° C.

We claim as our invention:

1. In a process for the recovery of 10-hydroxydecanoic acid from the oily 10-hydroxydecanoic acid-containing residue obtained by the sequential steps of (*a*) reacting ricinoleic acid with alkali metal hydroxide, (*b*) distilling lower boiling components from the resulting reaction mixture, (*c*) acidifying the resulting distillation residue and (*d*) extracting the acidified distillation residue with hot water, the improvement which comprises acetylating said oily 10-hydroxydecanoic acid-containing residue, separating 10-acetoxydecanoic acid from the resulting acetylation products, hydrolyzing said separated 10-acetoxydecanoic acid to 10-hydroxydecanoic acid, and separating 10-hydroxydecanoic acid from the resulting hydrolysis products.

2. In a process for the recovery of 10-hydroxydecanoic acid from the oily 10-hydroxydecanoic acid-containing residue obtained by the sequential steps of (a) reacting ricinoleic acid with alkali metal hydroxide, (b) distilling lower boiling components from the resulting reaction mixture, (c) acidifying the resulting distillation residue and (d) extracting the acidified distillation residue with hot water, the improvement which comprises subjecting said oily 10-hydroxydecanoic acid-containing residue to liquid extraction with a hydrocarbon solvent, thereby forming a solvent phase and a residual 10-hydroxydecanoic acid-containing phase, acetylating said 10-hydroxydecanoic acid-containing phase, separating 10-acetoxydecanoic acid from the resutling acetylation products, hydrolyzing the separated 10-acetoxydecanoic acid to 10-hydroxydecanoic acid, and separating said 10-hydroxydecanoic acid from the resulting hydrolysis reaction mixture.

3. The process in accordance with claim 2 wherein the said hydrocarbon solvent is petroleum ether.

References Cited in the file of this patent
UNITED STATES PATENTS

| | | |
|---|---|---|
| 2,510,802 | Clarke | June 6, 1954 |
| 2,693,480 | Haury | Nov. 2, 1954 |

FOREIGN PATENTS

| | | |
|---|---|---|
| 675,434 | Great Britain | July 9, 1952 |